US008166418B2

(12) United States Patent
Williams (10) Patent No.: US 8,166,418 B2
(45) Date of Patent: Apr. 24, 2012

(54) DEVICE AND METHOD OF CONVEYING MEANING

(75) Inventor: Roland E. Williams, Martinez, CA (US)

(73) Assignee: ZI Corporation of Canada, Inc., Calgary, Alberta (CA)

( * ) Notice: Subject to any disclaimer, the term of this patent is extended or adjusted under 35 U.S.C. 154(b) by 1001 days.

(21) Appl. No.: 11/752,669

(22) Filed: May 23, 2007

(65) Prior Publication Data

US 2007/0276814 A1 Nov. 29, 2007

Related U.S. Application Data (60) Provisional application No. 60/803,342, filed on May 26, 2006.

(51) Int. Cl.
*G06F 3/048* (2006.01)

(52) U.S. Cl. ......... 715/825; 715/752; 715/866; 715/977

(58) Field of Classification Search .................. 715/752, 715/758, 825, 838, 839, 866, 977; 707/3–5
See application file for complete search history.

(56) References Cited

U.S. PATENT DOCUMENTS

| | | | | |
|---|---|---|---|---|
| 5,404,435 A | * | 4/1995 | Rosenbaum | 715/205 |
| 5,524,193 A | * | 6/1996 | Covington et al. | 715/210 |
| 5,526,259 A | * | 6/1996 | Kaji | 704/3 |
| 5,659,742 A | * | 8/1997 | Beattie et al. | 1/1 |
| 5,684,999 A | * | 11/1997 | Okamoto | 704/9 |
| 5,818,447 A | * | 10/1998 | Wolf et al. | 715/752 |
| 5,873,107 A | | 2/1999 | Borovoy et al. | |
| 5,880,731 A | * | 3/1999 | Liles et al. | 715/758 |
| 6,021,412 A | * | 2/2000 | Ho et al. | 1/1 |
| 6,064,383 A | * | 5/2000 | Skelly | 715/758 |
| 6,161,108 A | * | 12/2000 | Ukigawa et al. | 1/1 |
| 6,584,328 B1 | | 6/2003 | Kung | |
| 6,629,793 B1 | * | 10/2003 | Miller | 400/472 |
| 6,801,659 B1 | * | 10/2004 | O'Dell | 382/185 |
| 6,904,560 B1 | * | 6/2005 | Panda | 715/202 |
| 6,963,839 B1 | * | 11/2005 | Ostermann et al. | 704/260 |
| 6,983,305 B2 | * | 1/2006 | Danker et al. | 709/204 |
| 6,987,991 B2 | * | 1/2006 | Nelson | 455/566 |
| 6,990,452 B1 | * | 1/2006 | Ostermann et al. | 704/260 |
| 7,035,803 B1 | * | 4/2006 | Ostermann et al. | 704/260 |
| 7,051,019 B1 | * | 5/2006 | Land et al. | 1/1 |
| 7,075,520 B2 | * | 7/2006 | Williams | 345/169 |

(Continued)

FOREIGN PATENT DOCUMENTS

CN 158203 2/2005

(Continued)

*Primary Examiner* — Weilun Lo
*Assistant Examiner* — Eric Wiener
(74) *Attorney, Agent, or Firm* — Michael A. Glenn; Glenn Patent Group (57) ABSTRACT

Methods of and devices for inserting a pictorial artifact into a text document are described. A relational database is used to link possible text-entries with pictorial artifacts. A pictorial artifact has a meaning that corresponds to its linked possible text-entry. When text is entered, the database is searched to determine whether a match exists between the entered text and one of the possible text-entries in the database. If a match is found, the linked pictorial artifact is provided to the user for selection and entry into the text document. The pictorial artifacts may be modified, and modified artifacts may be used in a search of the database to locate linked text-entries, in order to permit the user to select alternate text.

26 Claims, 4 Drawing Sheets

U.S. PATENT DOCUMENTS

| | | | |
|---|---|---|---|
| 7,133,900 B1 * | 11/2006 | Szeto | 709/206 |
| 7,159,192 B2 * | 1/2007 | Dobronsky | 715/835 |
| 7,167,731 B2 * | 1/2007 | Nelson | 455/566 |
| 7,177,811 B1 * | 2/2007 | Ostermann et al. | 704/260 |
| 7,185,285 B2 * | 2/2007 | Van Dok et al. | 715/753 |
| 7,256,769 B2 * | 8/2007 | Pun et al. | 345/171 |
| 7,257,618 B2 * | 8/2007 | Danker et al. | 709/206 |
| 7,359,688 B2 * | 4/2008 | Seo et al. | 455/218 |
| 7,379,066 B1 * | 5/2008 | Ostermann et al. | 345/473 |
| 7,386,453 B2 * | 6/2008 | Polanyi et al. | 704/270 |
| 7,484,175 B2 * | 1/2009 | Kirkland | 715/751 |
| 7,484,176 B2 * | 1/2009 | Blattner et al. | 715/758 |
| 7,503,007 B2 * | 3/2009 | Goodman et al. | 715/758 |
| 7,529,732 B2 * | 5/2009 | Liu et al. | 1/1 |
| 7,571,213 B2 * | 8/2009 | Walkush et al. | 709/206 |
| 7,587,378 B2 * | 9/2009 | Van Meurs | 706/46 |
| 7,609,270 B2 * | 10/2009 | Ostermann et al. | 345/473 |
| 7,610,194 B2 * | 10/2009 | Bradford et al. | 704/10 |
| 7,792,785 B2 * | 9/2010 | Clark et al. | 707/602 |
| 2001/0049596 A1 * | 12/2001 | Lavine et al. | 704/9 |
| 2002/0007276 A1 * | 1/2002 | Rosenblatt et al. | 704/260 |
| 2002/0077135 A1 * | 6/2002 | Hyon | 455/466 |
| 2002/0149611 A1 * | 10/2002 | May | 345/706 |
| 2002/0177454 A1 * | 11/2002 | Karri et al. | 455/466 |
| 2003/0035412 A1 * | 2/2003 | Wang et al. | 370/352 |
| 2003/0115552 A1 * | 6/2003 | Jahnke et al. | 715/536 |
| 2003/0210265 A1 * | 11/2003 | Haimberg | 345/758 |
| 2004/0091154 A1 * | 5/2004 | Cote | 382/232 |
| 2004/0236565 A1 * | 11/2004 | Wen et al. | 704/3 |
| 2005/0017954 A1 * | 1/2005 | Kay et al. | 345/169 |
| 2005/0081150 A1 * | 4/2005 | Beardow | 715/531 |
| 2005/0156873 A1 * | 7/2005 | Walter et al. | 345/156 |
| 2005/0160149 A1 * | 7/2005 | Durand et al. | 709/206 |
| 2005/0163379 A1 * | 7/2005 | Zimmermann | 382/190 |
| 2005/0223328 A1 * | 10/2005 | Ashtekar et al. | 715/706 |
| 2005/0278627 A1 * | 12/2005 | Malik | 715/530 |
| 2006/0001758 A1 * | 1/2006 | Nam et al. | 348/333.12 |
| 2006/0015812 A1 * | 1/2006 | Cunningham et al. | 715/535 |
| 2006/0047704 A1 * | 3/2006 | Gopalakrishnan | 707/104.1 |
| 2006/0066754 A1 * | 3/2006 | Zaima | 348/564 |
| 2006/0221059 A1 * | 10/2006 | Choi et al. | 345/169 |
| 2006/0247915 A1 * | 11/2006 | Bradford et al. | 704/1 |
| 2006/0256139 A1 * | 11/2006 | Gikandi | 345/689 |
| 2007/0178918 A1 * | 8/2007 | Shon | 455/466 |

FOREIGN PATENT DOCUMENTS

| | | | |
|---|---|---|---|
| EP | 1197879 A2 | | 4/2002 |
| KR | 2005054666 A | * | 6/2005 |
| KR | 2006059312 A | * | 6/2006 |
| WO | 02/099697 A1 | | 12/2002 |

* cited by examiner

DEVICE AND METHOD OF CONVEYING MEANING

CROSS-REFERENCE TO RELATED APPLICATIONS

This application claims the benefit of priority to U.S. provisional patent application serial number 60/803,342, filed on May 26, 2006.

FIELD OF THE INVENTION

The present invention relates to conveying meaning to a reader of a text message.

BACKGROUND OF THE INVENTION

Users of mobile appliances, such as cell phones and pocket computers, have discovered great utility in being able to exchange text messages. In order to improve efficiency, it has become commonplace to abbreviate or to modify text so as to speed entry of the text. The practice has become so commonplace that it has become a comprehensive subset of language. One such codifying of text has recently been referred to as "teen-speak" or "lingo" and has a significant following, but it is not universally useful and it is not trivial to interchange with conventional text.

As an example of how text may be codified, in teen-speak the numeric value 2 is used as a phonetic substitute for the words "to" "two" and "too". The numeric value 4 is used to substitute as "for" and the numeric value 8 may be seen for the letter trigram "ate" either as a word or as a syllable in longer words such as "mate" (m8), "gate" (g8), "innovate" (n of 8).

Professional users of text based services also use codification. In its simplest form, this may be simple abbreviation. As an example, aviation weather reports will usually alter, contract or abbreviate words in the interests of brevity of the text, relying on a trained reader to interpret the full meaning. In part there is an historical basis for this; because teletype systems were used to retrieve and show information, it was essential that the information code could in fact be represented entirely by the available machinery. A sample taken from Chicago O'Hare terminal area forecast, transmitted as FM0700 19013KT P6SM VCSH SCT035 OVC070 is translated to read "From 7 am coordinated universal time, the wind is expected to be from 190 degrees at 13 knots. The visibility is expected to exceed 6 statute miles with showers expected in the vicinity. There is a scattered cloud layer expected at 3,500 feet with an overcast layer expected at 7,000 feet." There is considerable efficiency from such codification but it is exceptionally difficult for an untrained user to read. Of course it is understood that codification extends to obfuscation of meaning as well, but in the case of this invention we may be less concerned with deliberate secrecy resulting from engineered cryptography.

Staying with the weather text example, intensity of a weather phenomenon may be indicated by simple characters such as + or − but we have the problem of needing to understand the contextual relationships between the elements of a sequence. Turning again to the weather example, +RA would mean heavy rain but −TSRA would be interpreted to mean Thunderstorm with Light Rain. The user is assumed to understand that it is the precipitation that is light, not the overarching thunderstorm conditions.

Recently, codification of text has included objects, such as icons. Use of these icons has been facilitated by improvements in the appliances and in the networks. An example of such objects are commonly named "emoticons". Emoticons typically use punctuation symbols in combination to give an emotional depth to electronic text exchanges. For example, by using three punctuation symbols a happy face may be made :-) or a sad face may be made :-(, either of which connote a much greater span of meaning than the text alone. The addition of a richer graphic environment allows these base symbologies to be replaced by more expressive icons such as ☺ and ☹.

SUMMARY OF THE INVENTION

The invention may be embodied as a method of inserting a pictorial artifact into a text document. In one such method, a relational database is provided. The database may have at least one possible text-entry that is linked to a pictorial artifact. Text may be received from an input device, and the database may be searched to determine whether the received text matches the possible text-entry that is linked. If the received text matches a possible text entry that is linked, then the linked pictorial artifact is provided. The provided pictorial artifact may be selected, and inserted into a text document.

Modification options may be provided and used to modify the selected pictorial artifact. If a modification option is selected, the pictorial artifact may be modified accordingly. If the pictorial artifact is modified, alternate text and/or an alternate pictorial artifact may be provided for selection.

The invention may also be embodied as an electronic appliance. One such appliance has a database having at least one possible text-entry that is linked to a pictorial artifact. An input device of the appliance may be capable of receiving text from a user. The appliance may also have a microprocessor that is programmed to carry out a method according to the invention. For example, the microprocessor may be programmed to (a) search the database to determine whether text received by the input device matches the possible text-entry that is linked, and (b) provide the linked pictorial artifact if the received text matches the possible text entry that is linked. A selection device of the appliance may allow the user to select the provided pictorial artifact, and a display device of the appliance may be able to display the selected pictorial artifact in conjunction with the received text. The display device may be able to provide modification options that may be used to modify the selected pictorial artifact. Such modification options may be provided to the display device by the microprocessor. To facilitate selection of a modification option, the selection device may include a controller that may be used to identify and select from a plurality of modification options.

BRIEF DESCRIPTION OF THE DRAWINGS

For a fuller understanding of the nature and objects of the invention, reference should be made to the accompanying drawings and the subsequent description. Briefly, the drawings are.

FURTHER DESCRIPTION OF THE INVENTION

Figure 1:
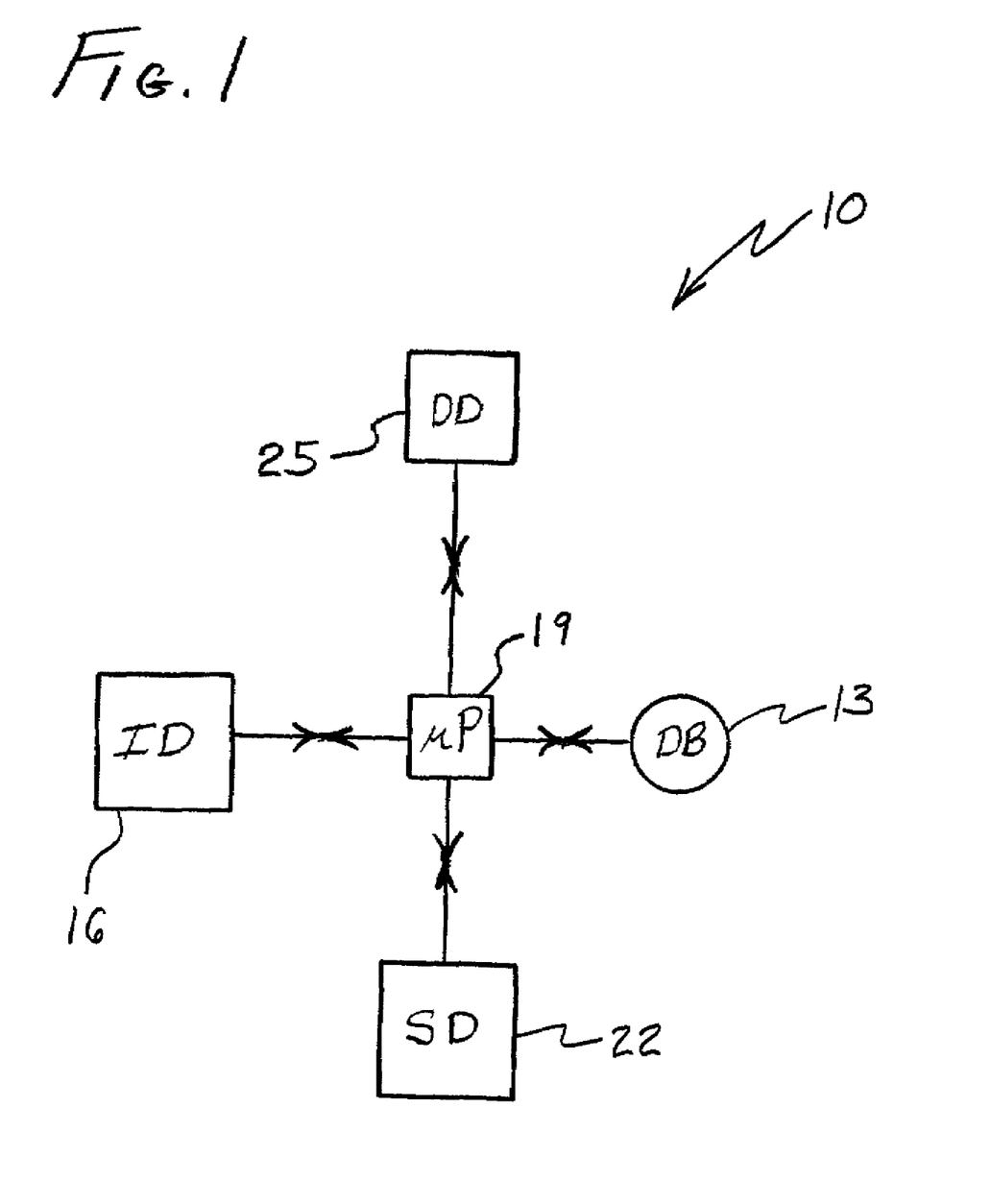
FIG. 1 schematically depicts an appliance according to the invention.
Figure 2:
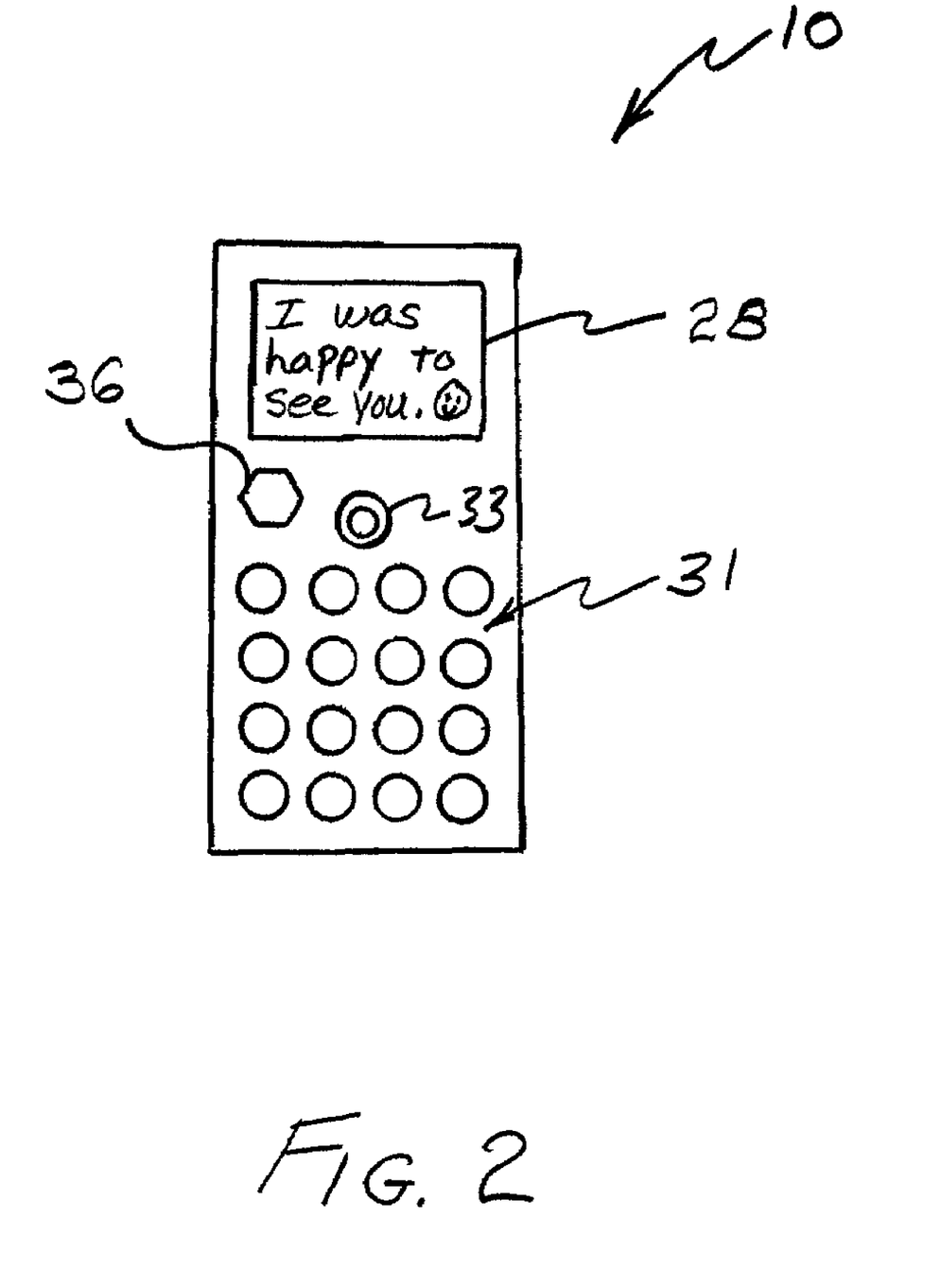
FIG. 2 depicts an appliance according to the invention.

The use of artifacts to convey meaning is a focus of the invention. FIG. 1 depicts in schematic form an electronic appliance 10 according to the invention. FIG. 2 depicts an appliance 10 according to the invention in non-schematic form. With reference to FIG. 1, there is shown an appliance 10 having a database 13, an input device 16, a microprocessor 19, a selection device 22 and a display 25.

Each of these is described in greater detail below. The database 13 may be searched by the microprocessor 19. Furthermore, the input device 16, selection device 22 and display 25 may be under the control of the microprocessor 19. As such, the appliance 10 will have software executable by the microprocessor 19 and which provides instructions to the microprocessor 19 for carrying out tasks.

The database 13 has a plurality of possible text-entries. For example, the possible text-entries may be words commonly found in a dictionary. At least one of the possible text-entries in the database 13 may be linked to a pictorial artifact. More than one pictorial artifact may be linked to a particular possible text-entry. As such, if a particular possible text-entry that is linked is identified, its corresponding pictorial artifact (or artifacts, as the case may be) may be retrieved. Also, more than one text entry may be linked to a particular pictorial artifact, and as such, if a particular pictorial artifact is identified, its corresponding text entry (or entries, as the case may be) may be retrieved.

The input device 16 may be capable of receiving text from a user of the appliance 10. For example, the input device 16 may include a monitor 28 and a means for selecting objects displayed by the microprocessor 19 on the monitor 28. If the monitor 28 is a touch sensitive screen which displays a virtual keyboard, the user can select letters from the virtual keyboard using his finger or a stylus. Alternatively, the input device 16 may include a plurality of buttons 31, each of which may be used to represent one or more letters. By pressing the buttons 31, the user may select letters in order to provide text. Alternatively, the input device 16 may use a track ball, joy stick or arrow buttons to move a cursor on the monitor 28 and a select button may be pressed by the user when the cursor identifies a desired letter or text object. Many cell phones include one or more such input devices. By using the input device 16, the user can provide text to the appliance 10, and that text may be compared to entries in the database 13 as part of an effort to locate a desired pictorial artifact.

Text may be received from a user of the appliance 10 using, for example, any of the usual methods of entry. In the case of deterministic entry, a text string may be entered letter by letter. Text may be entered, using a single press per letter, by keys 31 which may have more than one letter associated with a particular key 31, as in the case of a standard telephone keypad. In keeping with the predictive ability of certain implementations, after a certain number of the initial letters of a word have been entered, full or partial text candidates, which correspond to the initial sequence of letters, may be predicted by the microprocessor 19 and then displayed on the monitor 28 for user selection.

The microprocessor 19 may be programmed to carry out certain functions. For example, the microprocessor 19 may be programmed to search the database 13 to determine whether text received from the input device 16 matches a possible text-entry in the database 13 that is linked to a pictorial artifact. Furthermore, the microprocessor 19 may be programmed so that if the received text matches a possible text entry that is so linked, then the microprocessor 19 provides the linked pictorial artifact for that matching text entry. The microprocessor 19 may provide the pictorial artifact to a monitor 28, such as the touch sensitive screen used with the input device 16 (described above).

To illustrate this aspect of the appliance 10, the input device 16 may be used to provide the text "appreciate", and the database 13 may be searched by the microprocessor 19 to determine whether the word "appreciate" is among the possible text-entries stored in the database 13. Upon locating the possible text-entry "appreciate" in the database 13, the microprocessor 19 may determine that the linked pictorial artifact is the smiley face ☺, and the ☺ may be provided to the user via the monitor 28 for consideration and possibly selection by the user. If the user selects the ☺, then the ☺ is inserted to the text document. For instance, the ☺ may be inserted immediately after the text "appreciate", or the ☺ may be inserted at the end of the sentence in which the text "appreciate" appears. In this manner, the user may be able to better express the intensity with which he appreciates something.

The selection device 22 may be used by the user to select at least one of the provided pictorial artifacts. The selection device 22 may include a monitor 28 and a means for selecting objects caused to be displayed by the microprocessor 19 on the monitor 28. If the monitor 28 is a touch sensitive screen, the screen may display the provided pictorial artifacts so that the user can select one of the pictorial artifacts using his finger or a stylus to press in the vicinity of the desired artifact. It is possible for the monitor 28 used in the input device 16 to also be used in the selection device 22. For example, the touch sensitive screen used as part of the input device 16 may also be used as part of the selection device 22. Alternatively, the selection device 22 may use a track ball, joy stick or arrow buttons to move a cursor on the monitor 28 and a select button may be pressed by the user when the cursor identifies a desired pictorial artifact. It will now be recognized that the input device 16 and the selection device 22 may use the same components, the difference being afforded by what the microprocessor 19 displays on the monitor 28, and how the microprocessor 19 interprets indications provided by the user.

Once a pictorial artifact is selected, that pictorial artifact may be displayed on a display device 25, such as the monitor 28. The monitor 28 used for the input device 16 and/or the selection device 22 may be used as the display device 25. Under the control of the microprocessor 19, the display device 25 may be caused to provide the selected pictorial artifact in a desired position, such as at an end of a sentence in which the received text resides or next to the text which caused the pictorial artifact to be displayed.

The display device 25 may also be caused to provide modification options that may be used to modify the selected pictorial artifact. For example, one of the modification options might allow the user to change a color of the pictorial artifact, a fill-pattern of the pictorial artifact, or a density parameter used to depict the artifact on the display device 25.

The addition of color may extend the emotion exhibited via the artifact so that it has depth or intensity in addition to just a value. For example, colors at the red end of the spectrum may be interpreted as intense or positive, while colors at the blue end might signify indifference or negative attribution. An example of this can be seen in the "smiley face" artifact, where yellow may be used to signify "smiling and happy," while light red might be used to signify "smiling and embarrassed." In contrast, a "sad face" in blue might be used to signify sadness, whereas a "sad face" in red/purple could imply the sender was upset. In summary then, expression sets the basic value of the artifact, and the hue may be used to qualify the intensity of the emotion expressed by the artifact.

In one embodiment of the invention, the modification options may be provided and displayed as a spectral palette which may be used to change the fill parameter of the pictorial artifact. By way of example, the fill parameter may be the color used inside the pictorial artifact, or may be the adjustment of a density parameter in a monochrome system. Adjustment of the density may be perceived as a change in boldness of the lines used to create the pictorial artifact. It should be noted that in addition to modifying the density, the color of the lines may be modified too. In lieu of a spectral pallet, a numerical value may be used to identify the degree of boldness or color to be used in modifying the pictorial artifact. A slider control may also be used.

To illustrate the concept, consider that the text input may be the word "happy" and the linked artifact might be . Selecting the word "happy" to the text document being prepared by the user may allow the word "happy" to remain highlighted or active so that the user will know which word has been selected, and thereby assist the user with determining how the corresponding artifact should be modified by further actuation of a controller 33, such as a joystick or track ball. Upon indicating that a modification of the density parameter for the  is desired, the controller 33 of the appliance 10 may be arranged so that up-down movement allows changing the density of the lines making up the , and left-right movement allows the adjustment of the hue or tint of the lines making up the .

To facilitate selection of a desired modification option, the various modification options may be grouped together into a plurality of groups. For example, one group of modification options might be the color of the lines comprising the artifact, and another group of modification options might be the color of the fill-pattern inside the artifact. If the appliance provides a controller 33, the user may select one group by using the controller 33 in a first manner, and select a second group by using the controller 33 in a second manner. For instance, if the controller 33 is a joy stick, the user might press the joy stick away (the first manner) from the user to indicate a desire to select a different color for the pictorial artifact, and in response, a cursor may be moved on the monitor 28 until the cursor identifies which of the colors is desired for the lines of the pictorial artifact. However, if the user desires a different fill-pattern, the joy stick may be pressed to the left (the second manner) until a cursor on the monitor 28 identifies the color of the desired fill-pattern for the pictorial artifact.

The appliance 10 may also include a speaker 36. If one of the modification options includes sound, then that sound may be made audible using the speaker 36.

In an embodiment of the invention, the microprocessor 19 may be programmed to search the database 13 for alternate text corresponding to a modified pictorial artifact. If alternate text corresponding to the modified pictorial artifact is located, then the display device 25 may be caused to provide the alternate text corresponding to the modified pictorial artifact. In this fashion, the user may provide an initial text object, select a pictorial artifact corresponding to that initial text object, identify a modification of that pictorial artifact, and then the microprocessor 19 may search the database 13 for possible text entries that are linked to the modified pictorial artifact. Consequently, although the user may initially identify a text object, the user may ultimately replace that text object with another text object that better expresses the user's intent, and this may be done by selecting and modifying a pictorial object.

Figure 3:
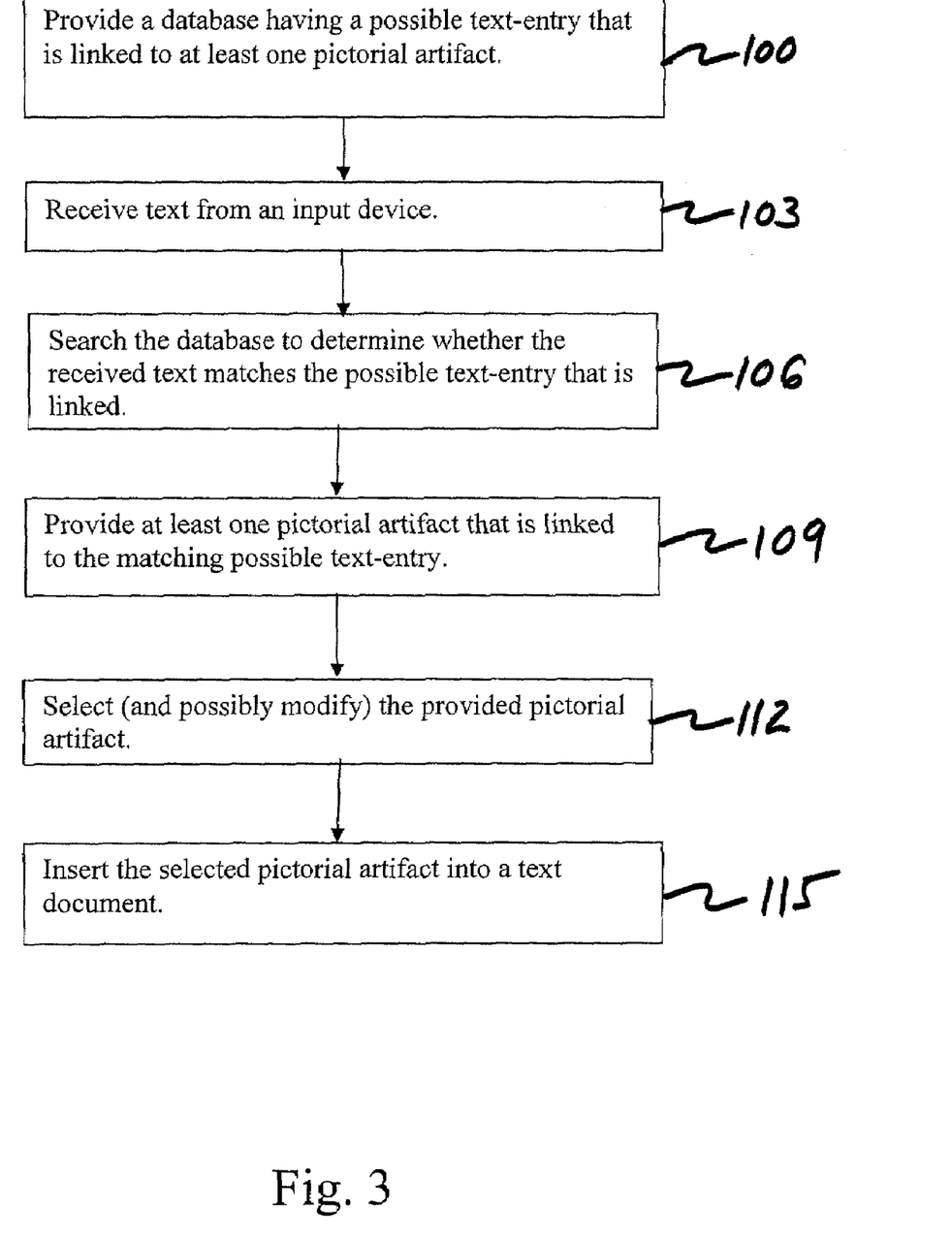
FIG. 3 is a flow diagram of a method according to the invention.

The invention may be embodied as a method of conveying meaning. One such method is depicted in FIG. 3. In that method, the end result is that a pictorial artifact is inserted into a text document.

The method depicted in FIG. 3 may begin by providing 100 a database. The database has at least one possible text-entry that is linked to a pictorial artifact. More than one pictorial artifact may be linked to a particular possible text-entry, and more than one text entry may be linked to a particular pictorial artifact. Text is received 103 from an input device, and the database is searched 106 to determine whether the received text matches the possible text-entry that is linked. If the received text matches the possible text entry that is linked, then the linked pictorial artifact is provided 109. A user may then select 112 the provided pictorial artifact, and the selected pictorial artifact may be inserted 115 into a text document. The selected pictorial artifact may be inserted 115 into the text document at an end of a sentence in which the received text resides, or the selected pictorial artifact may be inserted 115 next to the received text.

Figure 4:
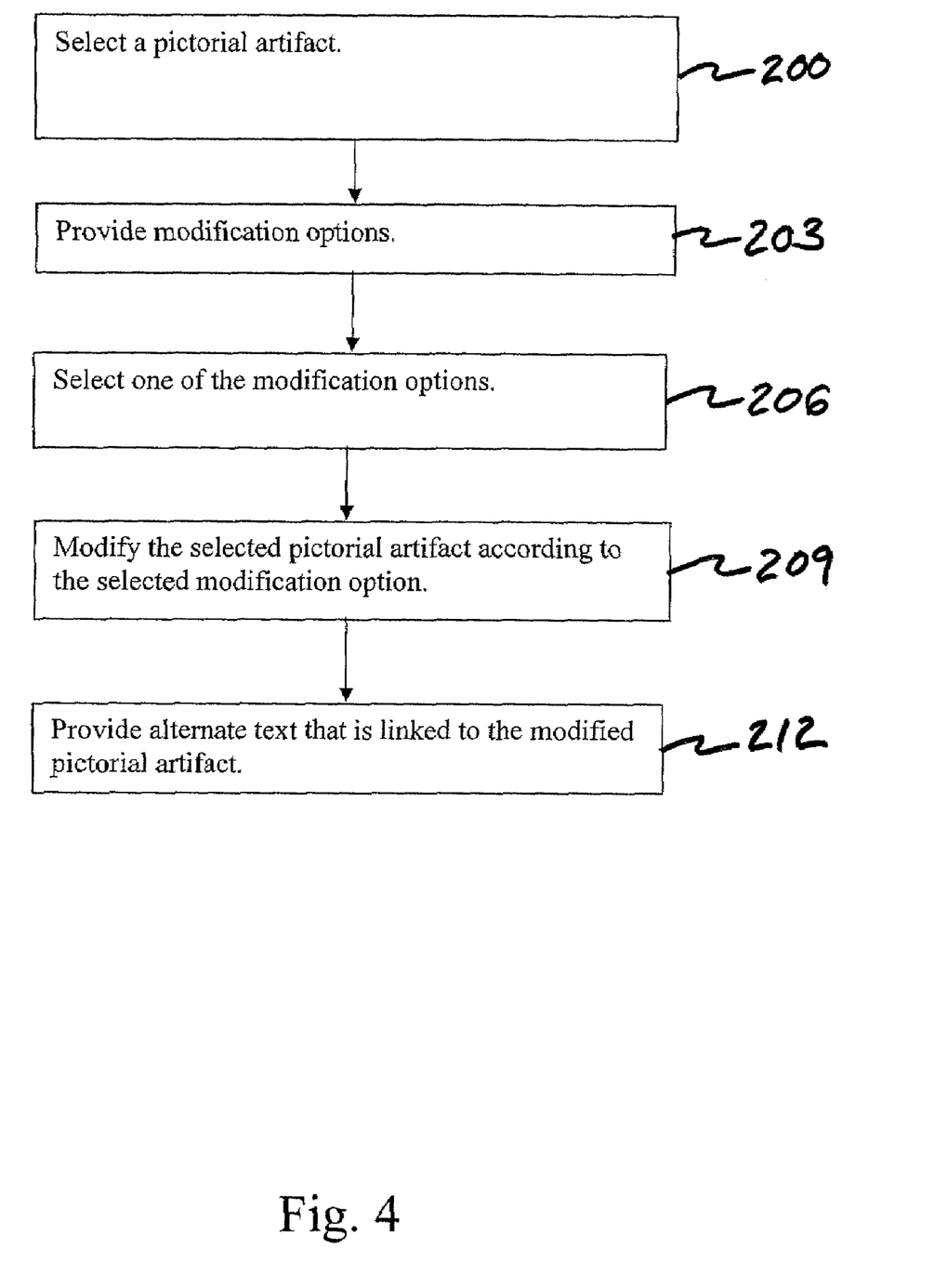
FIG. 4 is a flow diagram of part of a method according to the invention.

The method described above may be carried out to afford the user the opportunity to modify the selected pictorial artifact. FIG. 4 depicts a method of modifying a selected artifact. For example, after selecting 200 a pictorial artifact, modification options may be provided 203, and these options may be used by the user to modify the selected pictorial artifact. To accomplish this, the user may select 200 one of the provided modification options, and the pictorial artifact may be modified 209 in a manner that is in keeping with the selected modification option.

One or more of the modification options may correspond to an intensity. For example, color may be used to express the intensity with which the user feels that the selected pictorial artifact comports with his/her feelings. Other modification options may permit the user to select a pattern, such as dashed, dotted or solid lines. To illustrate the idea, the pictorial artifact may be modified to change the solid lines to dotted lines, those lines may be made green, and the fill pattern may be changed to be blue dots.

Another type of modification option may permit the user to alter a density parameter of the selected pictorial artifact. For example, the lines that create the selected pictorial artifact may be made darker, lighter, wider, or narrower depending on what the user selects as the modification option.

Yet another type of modification option may permit the user to include sound corresponding to a pictorial artifact. For example, if the user selects a smiley face, the user may modify the smiley face artifact to associate with the artifact a sound that comports with a happy person. For instance, the sound may be a whistled rendition of the song "Put On A Happy Face".

Modification options may be selected 206 by moving a controller 33. For example, a cursor may be made to move through a list of modification options displayed on monitor 28 by pressing a joy stick in a particular manner, or an arrow key 31 may be used to move the cursor through the list of modification options. Once the desired modification option is identified using the controller 33, the user may select the desired modification option, for example by pressing the joy stick into the appliance 10, or pressing a "select" key 31 provided on the appliance 10.

If there are many modification options, it may be useful to group the modification options and permit the user to scroll through a first group of the modification options by moving the controller 33 in a first manner, and scroll through a second group of the modification options by moving the controller 33 in a second manner. When the controller 33 is a joy stick, the "first manner" may be pressing the joy stick in one direction, and the "second manner" may be pressing the joy stick in another direction. In doing so, the user may easily scroll through a list of modification options quickly, thereby allowing the user to identify a desired modification option more easily.

If the user selects 206 a modification option, the method may be carried out so as to provide alternate text 212, which corresponds to the modified pictorial artifact. To do so, the database may be searched for text that is linked to the modified version of the pictorial artifact, and if the search identifies text that is different from that selected by the user, then the alternate text may be provided to the user for selection. If the user decides that the alternate text is desirable, the user may select the alternate text. Upon selecting alternate text, the alternate text may be substituted for the text initially selected by the user.

To illustrate this aspect more concretely, consider the situation in which the user provides the word "happy" and the ☺ artifact is provided, the user may alter the hue of the smiley face from the standard light yellow, that might be suggestive of a sunny disposition, to a different hue such as pink. Assuming that a pink smiley face is normally associated with mild pleasure or delight, the database might have previously linked the word "delighted" with a pink smiley face, and in that situation, the microprocessor may search the database for text linked to the pink smiley face, and provide the user with the option to substitute the word "delighted" for the word "happy".

In keeping with cultural conventions, the modification of a pictorial artifact may be accompanied by a change in the artifact itself. For example moving the hue of the standard smiley face from yellow to blue might adjust the smile to a neutral expression or a sad expression. In this manner, the artifact itself may be adjusted so as to move from the standard smiley face ☺ to a sad face ☹, and the corresponding linked words "sad", "unhappy", and/or "glum" may be presented to the user for selection as alternate text.

In one embodiment of the invention, the alternate text provided in response to modifying a pictorial object may be text that is in a language different from that of the text initially received from the user. In this manner, a foreign-language word may be provided in the text document, and this may be particularly useful when the foreign-language word carries a meaning that is more precisely in keeping with the user's feelings. Furthermore, since language has strong cultural linkages, when this technique is applied, emotional data may be conveyed via the pictorial artifact so as to transcend simple transliteration, and may allow much more accurate translation of the text.

In a similar manner, when a pictorial artifact is modified, an alternate pictorial artifact may be provided to the user for selection. In this manner, although the user may initially select a pictorial artifact that seems acceptable, the appliance may subsequently permit the user to identify and select a pictorial artifact that is closer to that desired by the user. For example, if the user initially selects the smiley face artifact, subsequently modifies that artifact to have a red fill-pattern, the appliance 10 may provide a suggested alternate pictorial artifact that is a stick figure with its hands on its hips.

The method may be carried out so as to highlight the received text until the linked pictorial artifact is selected. In this manner, the user may quickly and easily remind himself about the text for which a pictorial artifact may be selected. This may assist the user in identifying an appropriate pictorial artifact, and in modifying 209 a selected pictorial artifact.

Although indicated above, it is may be useful to remember that a pictorial artifact may be selected by touching a portion of the monitor 28 where the pictorial artifact is displayed. Alternatively, a cursor may be moved so as to highlight or underline an artifact and then the user may press an "enter" button on the appliance to indicate that the identified artifact should be selected and provided to the text document. In a particularly sophisticated embodiment of the invention, the user may navigate over a spectral palette using a touch sensitive screen so as to not only select a particular pictorial artifact, but also modify the artifact using a continuous motion. The artifact may be activated by placing a stylus or finger to the monitor 28 at the artifact location and the hue or tint may be altered by moving the stylus or finger in a particular direction, for example radially from the artifact, and the radial direction and distance may be used by the microprocessor to determine the type of modification desired by the user. In this way an exceptionally rich range of emotions may be easily and quickly expressed.

In a particularly interesting embodiment of the invention, the pictorial artifact may be a sprite. In this manner, the movement provided by the sprite may be somewhat entertaining, more likely to catch the attention of the reader, and/or be particularly memorable. In so doing, the corresponding text may be made more valuable to both the sender and the receiver. For example, if the user provides the word "frustrated", a sprite artifact that animates to a stick figure banging its head on a wall might be provided to the user for selection. When combined with a sound, such a sprite may be made even more meaningful. In this example, a dull repetitive thud might be representative of an obstacle being encountered when the head of the sprite strikes a wall. Alternatively, the sound associated with the sprite banging its head might be the sound of a brief scream, which may be intended to signify the failure of a protracted effort resulting in extreme frustration. By enabling the user to associate different sounds with a sprite, the user is enabled to associate different connotations with a particular sprite.

Although the present invention has been described with respect to one or more particular embodiments, it will be understood that other embodiments of the present invention may be made without departing from the spirit and scope of the invention. Hence, the present invention is deemed limited only by the appended claims and the reasonable interpretation thereof.

What is claimed is:

1. A method of inserting a pictorial artifact into a mobile device text document, comprising:

providing a database containing a plurality of objects that are linked to at least one pictorial artifact, wherein said database is operatively coupled with a mobile device comprising a processor, a display, a selection device, and a reduced keyboard comprising a plurality of keys, each key being associated with at least two characters;

receiving at least one text string from an input device of said mobile device, wherein said text string comprises a plurality of key inputs;

predicting, after each key input, one or more object candidates corresponding to said at least one text string;

searching the database to determine whether the object candidate matches an object that is linked with at least one pictorial artifact;

determining, after each key input, whether said object candidate matches a particular object that is linked to at least one pictorial artifact;

if the object candidate matches a particular object that is linked with a pictorial artifact, then automatically displaying the linked pictorial artifact on said display device;

receiving a user indication via said selection device;

interpreting said indication, by said processor, thereby determining whether pictorial artifact after said object candidate or reject the insertion and display of the provided pictorial artifact after the display of said object candidate;

inserting and displaying on said display the selected pictorial artifact into a text document upon confirmation that said indication is meant to confirm insertion and display of the provided pictorial artifact after the display of said object candidate;

providing modification options that may be used to modify the confirmed pictorial artifact;

selecting a modification option; and modifying the confirmed pictorial artifact according to the selected modification option.

2. The method of claim 1, wherein the confirmed pictorial artifact is inserted into the text document at an end of a sentence in which the object candidate resides.

3. The method of claim 1, wherein the modification options correspond to the appearance of lines comprising the pictorial artifact.

4. The method of claim 1, wherein at least one of the modification options changes a color of the pictorial artifact.

5. The method of claim 1, wherein at least one of the modification options changes a fill-pattern of the pictorial artifact.

6. The method of claim 1, wherein at least one of the modification options is a density parameter.

7. The method of claim 1, wherein at least one of the modification options includes sound.

8. The method of claim 1, wherein said mobile device further comprises a movable controller wherein a first set of the modification options may be selected by moving the controller in a first manner, and a second set of the modification options may be selected by moving the controller in a second manner.

9. The method of claim 1, further comprising searching the database for alternate objects corresponding to the modified pictorial artifact, and providing the alternate objects corresponding to the modified pictorial artifact.

10. The method of claim 9, wherein the alternate objects includes word objects from a language different from that of the received text.

11. The method of claim 1, further comprising providing an alternate pictorial artifact corresponding to the modified pictorial artifact.

12. The method of claim 1, further comprising highlighting the received text until the linked pictorial artifact is selected.

13. The method of claim 1, wherein selecting the provided pictorial artifact is accomplished by touching a portion of said display where the pictorial artifact is displayed.

14. The method of claim 1, wherein the pictorial artifact is a sprite.

15. The method of claim 1, wherein the display comprises a touch screen display, wherein the keyboard comprises a virtual keyboard, and wherein the selection device comprises a virtual selection device.

16. A mobile device comprising:

a database containing a plurality of objects that are linked to at least one pictorial artifact;

a display device;

a reduced keyboard comprising a plurality of keys, each key being associated with at least two characters, wherein said reduced keyboard is capable of receiving text strings from a user;

a microprocessor configured to:

predict, after each key input, one or more object candidates corresponding to said at least one text string;

search the database to determine whether the object candidates is linked with at least one pictorial artifact;

determine, after each key input, whether said object candidate matches a particular object that is linked to at least one pictorial artifact; and if the object candidate matches a particular object that is linked with a pictorial artifact, then automatically displaying the linked pictorial artifact on said display device;

a selection device which allows the user to provide a user indication to confirm or reject the insertion and display of said pictorial artifact, wherein the processor is further configured for interpreting said indication, by said processor, thereby determining whether said indication is meant to confirm insertion and display of the provided pictorial artifact after the display of said object candidate or reject the insertion and display of the provided pictorial artifact after the display of said object candidate; and a display device which is able to display the selected pictorial artifact in conjunction with the received text upon confirmation that said indication is meant to confirm insertion of the provided pictorial artifact after said object candidate;

wherein the display device is able to provide modification options that may be used to modify the selected pictorial artifact.

17. The mobile device of claim 16, wherein the display device displays the selected pictorial artifact at an end of a sentence in which the received text resides.

18. The mobile device of claim 16, wherein at least one of the modification options changes a color of the pictorial artifact.

19. The mobile device of claim 16, wherein at least one of the modification options changes a fill-pattern of the pictorial artifact.

20. The mobile device of claim 16, wherein at least one of the modification options changes a density parameter of the pictorial artifact.

21. The mobile device of claim 16, further comprising a speaker, and wherein at least one of the modification options includes sound that may be made audible using the speaker.

22. The mobile device of claim 16, wherein the selection device includes a controller, and a first set of the modification options may be selected by moving the controller in a first manner, and a second set of the modification options may be selected by moving the controller in a second manner.

23. The mobile device of claim 16, wherein the microprocessor is programmed to search the database for an alternate object corresponding to a modified pictorial artifact, and causing the display to provide the alternate objects corresponding to the modified pictorial artifact.

24. The mobile device of claim 23, wherein the alternate objects includes objects from a language different from that of the received text string.

25. The mobile device of claim 16, wherein the selection device and the display device use a single monitor.

26. The mobile device of claim 16, wherein the display comprises a touch screen display, wherein the keyboard comprises a virtual keyboard, and wherein the selection device comprises a virtual selection device.

* * * * *